(12) United States Patent
Zargar et al.

(10) Patent No.: US 10,079,023 B2
(45) Date of Patent: Sep. 18, 2018

(54) COMFORT NOISE GENERATION APPARATUS AND METHOD

(71) Applicant: Microsemi Semiconductor (U.S.) Inc., Austin, TX (US)

(72) Inventors: Tanmay Zargar, Austin, TX (US); Dillon Reed Ritter, Austin, TX (US); Rodolfo Silva, Austin, TX (US)

(73) Assignee: Microsemi Semiconductor (U.S.) Inc., Austin, TX (US)

( * ) Notice: Subject to any disclaimer, the term of this patent is extended or adjusted under 35 U.S.C. 154(b) by 0 days.

(21) Appl. No.: 15/272,467

(22) Filed: Sep. 22, 2016

(65) Prior Publication Data

US 2017/0092281 A1    Mar. 30, 2017

Related U.S. Application Data

(60) Provisional application No. 62/232,489, filed on Sep. 25, 2015.

(51) Int. Cl.
*G10L 25/78* (2013.01)
*G10L 19/012* (2013.01)
(Continued)

(52) U.S. Cl.
CPC ........ *G10L 19/012* (2013.01); *G10L 21/0232* (2013.01); *G10L 25/84* (2013.01);
(Continued)

(58) Field of Classification Search
CPC .. G03G 5/0614; G03G 5/0672; G03G 5/0575; G03G 5/0578; G03G 5/0564; G03G 5/0609; G03G 5/0612
(Continued)

(56) References Cited

U.S. PATENT DOCUMENTS 5,341,456 A  *  8/1994  DeJaco ................... G10L 19/24
                                                          704/214
5,646,991 A     7/1997  Sih
(Continued)

FOREIGN PATENT DOCUMENTS

| EP | 0855827 A2 | 7/1998 |
| WO | 00/25441 | 5/2000 |
| ZA | 98/0761 | 8/1998 |

OTHER PUBLICATIONS

International Search Report for parallel PCT/US2016/052977 issued by the European Patent Office dated Nov. 9, 2016.
(Continued)

*Primary Examiner* — Bharatkumar S Shah
(74) *Attorney, Agent, or Firm* — Simon Kahn

(57) ABSTRACT

A comfort noise generation apparatus constituted of: near and far end speech detectors arranged to detect speech activity in near-end and far-end signals and a comfort noise generator, wherein responsive to an indication from the near-end speech detector that speech activity is absent on the near-end signal and an indication from the far-end silence detector that speech activity is absent on the far-end signal, the comfort noise generator is arranged to initiate a determination of an estimation of near-end background noise, wherein responsive to an indication from the near-end speech detector that speech activity is present on the near-end signal or an indication from the far-end silence detector that speech activity is present on the far-end signal, the comfort noise generator is arranged to terminate the estimation determination of near-end background noise, and wherein the comfort noise generator is arranged to output a function of the near-end background noise estimation.

10 Claims, 4 Drawing Sheets

(51) Int. Cl.
*G10L 21/0232* (2013.01)
*G10L 25/84* (2013.01)
*H04M 9/08* (2006.01)
*G10L 21/0208* (2013.01)
*G10L 21/0216* (2013.01)

(52) U.S. Cl.
CPC .............. *H04M 9/082* (2013.01); *G10L 25/78* (2013.01); *G10L 2021/02082* (2013.01); *G10L 2021/02168* (2013.01)

(58) Field of Classification Search
USPC ........................................................ 704/233
See application file for complete search history.

(56) References Cited

U.S. PATENT DOCUMENTS

| | | | |
|---|---|---|---|
| 5,920,834 A | 7/1999 | Sih et al. | |
| 6,597,787 B1 | 7/2003 | Lindgren et al. | |
| 7,243,065 B2 | 7/2007 | Stephens et al. | |
| 8,520,859 B2 | 8/2013 | Li et al. | |
| 8,589,153 B2* | 11/2013 | Khalil | G10L 19/012 704/215 |
| 2010/0104091 A1* | 4/2010 | Yue | H04B 3/234 379/406.08 |
| 2011/0228946 A1* | 9/2011 | Chen | G10L 19/012 381/61 |
| 2013/0006622 A1* | 1/2013 | Khalil | G10L 19/012 704/233 |

OTHER PUBLICATIONS

Written Opinion of the International Searching Authority for parallel PCT/US2016/052977 issued by the European Patent Office dated Nov. 9, 2016.

* cited by examiner

COMFORT NOISE GENERATION APPARATUS AND METHOD

BACKGROUND

Comfort noise (or comfort tone) is synthetic background noise used in radio and wireless communications to fill the artificial silence in a transmission resulting from voice activity detection or from the audio clarity of modern digital lines.

In a full-duplex voice communication system, when only the far-end talker is talking, the acoustic echo cancellation and noise reduction algorithms sometimes suppress the echo and noise so well that the far-end talker hears absolute silence. When the near-end talker starts talking, some background noise may be transmitted thus providing the far-end listener with a very unnatural conversational experience. To address this problem, comfort noise is generated and transmitted to the far-end when only the far-end is talking.

Further, when transitioning between the states when comfort noise is not being played, it is desired to provide a seamless experience in terms of matching the amplitude and spectral content of the background noise as closely as possible.

U.S. Pat. No. 7,243,065 granted on Jul. 10, 2007 to Stephens et al., the entire contents of which is incorporated herein by reference, is addressed to a comfort noise generator. Unfortunately, the described comfort noise generator does not provide a high enough quality comfort noise.

SUMMARY OF THE INVENTION

Accordingly, it is a principal object of the present invention to overcome at least some of the disadvantages of prior art comfort noise generation apparatuses. This is accomplished in one embodiment by comfort noise generation apparatus comprising: a near-end speech detector arranged to detect speech activity in a near-end signal; a far-end silence detector arranged to detect speech activity in a far-end signal; and a comfort noise generator, wherein responsive to an indication from the near-end speech detector that speech activity is absent on the near-end signal and an indication from the far-end silence detector that speech activity is absent on the far-end signal, the comfort noise generator is arranged to initiate a determination of an estimation of near-end background noise, wherein responsive to an indication from the near-end speech detector that speech activity is present on the near-end signal or an indication from the far-end silence detector that speech activity is present on the far-end signal, the comfort noise generator is arranged to terminate the estimation determination of near-end background noise, and wherein the comfort noise generator is arranged to output a function of the near-end background noise estimation.

In one further embodiment, the apparatus further comprises a near-end voice activity detector arranged to detect speech activity in the near-end signal, wherein the arrangement of the near-end voice activity detector to detect speech activity comprises an arrangement to distinguish between speech and background noise and the arrangement of the near-end speech detector to detect speech activity comprises an arrangement to distinguish between speech and an acoustic echo of the far-end signal, and wherein the initiation of the estimation determination is further responsive to an indication from the near-end voice activity detector that speech activity is absent on the near-end signal. In another further embodiment, the estimation determination comprises an auto-regressive moving average filtering of each of a plurality of frequency components of an output of an acoustic echo canceller.

In one further embodiment the initiation of the estimation determination comprises an update of a previous background noise estimation. In another further embodiment, the function of the near-end background noise estimation comprises a modulation of white noise fast-Fourier transform coefficients using the near-end background noise estimation.

Independently, a comfort noise generation method is provided, the method comprising: detecting the absence of speech activity in a near-end signal; detecting the presence of speech activity in a near-end signal; detecting the absence of speech activity in the far-end signal; detecting the presence of speech activity in the far-end signal; responsive to the detection that speech activity is absent on the near-end signal and the detection that speech activity is absent on the far-end signal, initiating a determination of an estimation of near-end background noise; responsive to the detection that speech activity is present on the near-end signal or the detection that speech activity is present on the far-end signal, terminate the estimation determination of near-end background noise; and outputting a function of the near-end background noise estimation.

In one further embodiment the detecting the absence and presence of speech activity in the near-end signal comprises: distinguishing between speech and background noise; and distinguishing between speech and an acoustic echo of the far-end signal, wherein the estimation determination is initiated responsive to a first indication of the absence of speech from the near-end signal and a second indication of the absence of speech from the near-end signal, the first indication responsive to the distinguishing between speech and background noise and the second indication responsive to the distinguishing between speech and the far-end signal echo. In another further embodiment the estimation determination comprises an auto-regressive moving average filtering of each of a plurality of frequency components of an output of an acoustic echo canceller.

In one further embodiment the initiation of the estimation determination comprises updating a previous background noise estimation. In another further embodiment the function of the near-end background noise estimation comprises a modulation of white noise fast-Fourier transform coefficients using the near-end background noise estimation Additional features and advantages of the invention will become apparent from the following drawings and description.

BRIEF DESCRIPTION OF THE DRAWINGS

For a better understanding of the invention and to show how the same may be carried into effect, reference will now be made, purely by way of example, to the accompanying drawings in which like numerals designate corresponding sections or elements throughout.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawings.

DETAILED DESCRIPTION OF THE PREFERRED EMBODIMENTS

Figure 1:
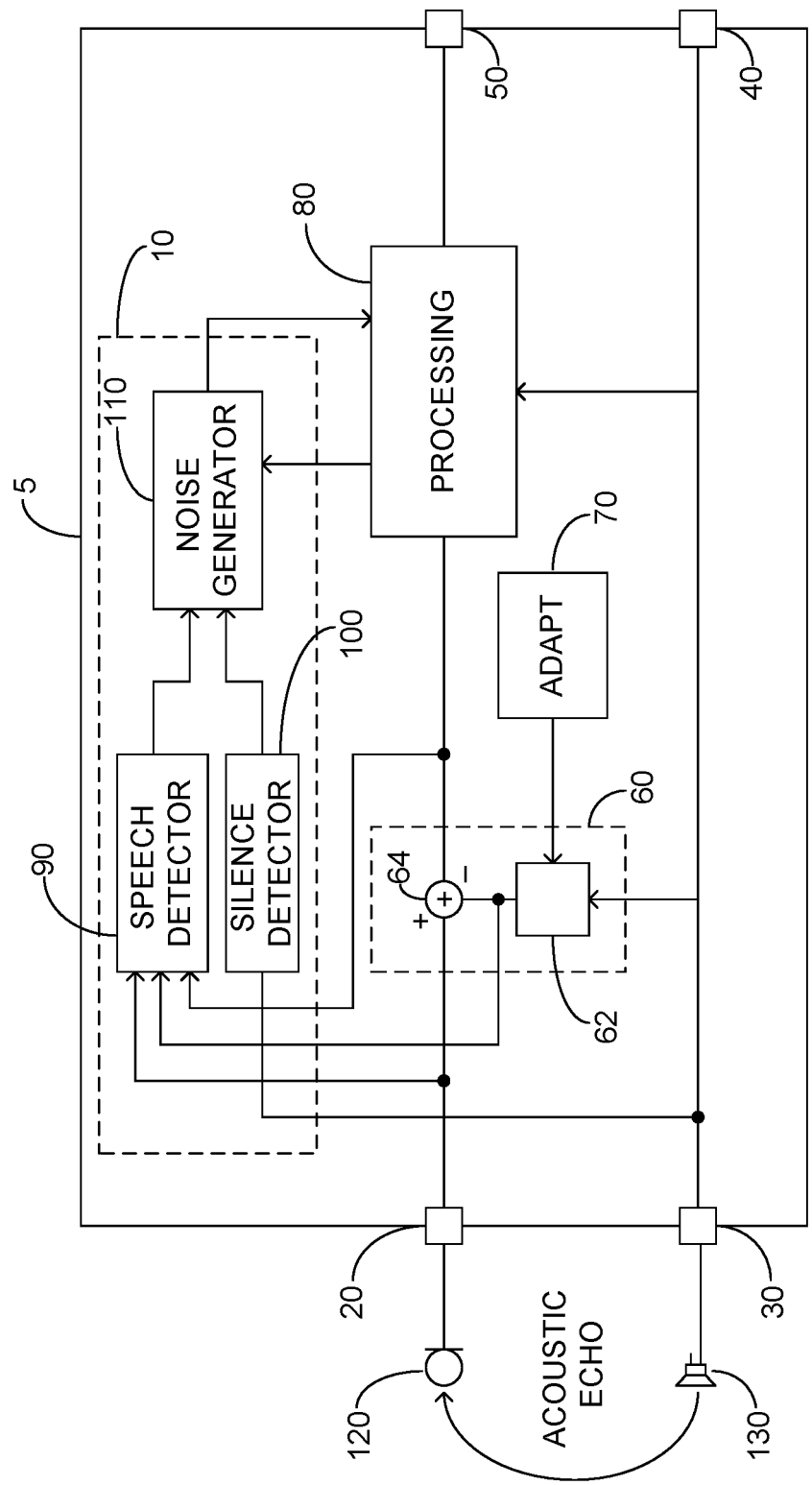
FIG. 1 illustrates a high level block diagram of a communication device portion comprising a comfort noise generation apparatus and a processing functionality, according to certain embodiments.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

FIG. 1 illustrates a high level block diagram of a communication device portion 5, comprising a comfort noise generation apparatus 10; a near-end input 20; a near-end output 30; a far-end input 40; a far-end output 50; an acoustic echo canceller 60 comprising an acoustic echo estimation functionality 62 and an adder 64; an adaption control functionality 70; and a processing functionality 80. Comfort noise generation apparatus 10 comprises: a near-end speech detector 90; a far-end silence detector 100; and a comfort noise generator 110. Communication device portion 5 is located within a voice communication device, such as a telephone. Acoustic echo canceller 60, adaption control functionality 70, processing functionality 80, near-end speech detector 90, far-end silence detector 100 and comfort noise generator 110 are each implemented as any of an ASIC functionality, dedicated analog functionality, or as instructions stored on a memory and arranged to be implemented by a processor.

Near-end input 20 is coupled to: a microphone 120; a respective input of near-end speech detector 90; and a respective input of adder 64 of acoustic echo canceller 60. An output of adder 64 is coupled to: a respective input of near-end speech detector 90; and a respective input of processing functionality 80. An output of acoustic echo estimation functionality 62 of acoustic echo canceller 60 is coupled to a respective input of adder 64 and a respective input of near-end speech detector 90. An output of adaption control functionality 70 is coupled to a respective input of acoustic echo estimation functionality 62. Far-end input 40 is coupled to: near-end output 30; a respective input of processing functionality 80; an input of acoustic echo estimation functionality 62 of acoustic echo canceller 60; and an input of far-end silence detector 100. An output of each of near-end speech detector 90 and far-end silence detector 100 is coupled to a respective input of comfort noise generator 110. An output of comfort noise generator 110 is coupled to a respective input of processing functionality 80 and a first output of processing functionality 80 is coupled to a respective input of comfort noise generator 110. A second output of processing functionality 80 is coupled to far-end output 50.

In operation, a far-end signal is received at far-end input 40. Particularly, the far-end signal is a digital, or analog, representation of a voice received at a microphone at a voice communication device in communication with acoustic echo change detection apparatus 10, such as a telephone in communication with the telephone comprising acoustic echo change detection apparatus 10. Similarly, a near-end signal is received at near-end input 20. Particularly, the near-end signal is a digital, or analog, representation of a voice received by microphone 120.

The received far-end signal is acoustically output by speaker 130 and picked up by microphone 120 after passing through a near-end acoustic echo path, i.e. the space between speaker 130 and microphone 120. As a result, the near-end signal further comprises the far-end signal which was output by speaker 130 and sent back to the far-end telephone as an echo. Acoustic echo canceller 60 is arranged to reduce the acoustic echo on the near-end signal, as known to those skilled in the art at the time of the invention. Particularly, acoustic echo estimation functionality 62 is arranged to estimate the acoustic echo within the near-end signal by estimating the time it will take for the far-end signal to be picked up by microphone 120 and the attenuation thereof along near-end acoustic echo path. The estimation is output by acoustic echo estimation functionality 62 to adder 64. Adder 64 is arranged to remove from the near-end signal a copy of the echo estimation. The signal output by acoustic echo canceller 60 thus comprises the near-end signal with the acoustic echo of the far-end signal being cancelled out, or significantly reduced. Therefore, the signal output by acoustic echo canceller 60 will be a more accurate representation of the voice of a near-end speaker. Adaption functionality 70 is arranged to control the modes of acoustic echo estimation functionality 62 responsive to additional detectors (not shown), such as a silence detector and a double talk detector, as known to those skilled in the art at the time of the invention.

Processing functionality 80 is further arranged to process the output signal of acoustic echo canceller 60 before outputting the signal to far-end output 50. In one embodiment, processing functionality 80 is arranged to convert the signal from the time domain to the frequency domain, preferably by performing a fast Fourier transform (FFT). Processing functionality 80 is further arranged to group the FFT power coefficients into frequency sub-bands, optionally 22 sub-bands based on the Bark scale, as known to those skilled in the art at the time of the invention. Within each frequency sub-band, processing functionality 80 is further arranged to: remove noise and residual echo from the signal; perform equalization; and convert the FFT power coefficients back into the time domain. The processed signal is then output from near-end output 50. In one embodiment, the processing of processing functionality 80 is performed every 10 ms on buffers of samples of the FFT power coefficients within the respective sub-bands.

Near-end speech detector 90 is arranged to detect speech activity in the received near-end signal and far-end silence detector 100 is arranged to detect speech activity in the received far-end signal, as known to those skilled in the art at the time of the invention. Optionally, near-end speech detector 90 is arranged to detect speech activity in the near-end signal responsive to various cross correlation functions applied to: the near-end signal; the output acoustic echo estimate of acoustic echo estimation functionality 62;

and the output of adder 64 of acoustic echo canceller 60. Additionally, optionally far-end silence detector 100 is arranged to detect speech activity in the far-end signal responsive to various cross correlation functions applied to the far-end signal.

When near-end speech detector 90 detects the absence of speech activity in the received near-end signal, near-end speech detector 90 is arranged to output an indication of such absence to comfort noise generator 110. When far-end speech detector 100 detects the absence of speech activity in the received near-end signal, far-end silence detector 100 is arranged to output an indication of such absence to comfort noise generator 110. Responsive to both a received indication of the absence of speech activity in the near-end signal and a received indication of the absence of speech activity in the far-end signal, comfort noise generator 110 is arranged to initiate a determination of an estimation of near-end background noise. Particularly, during the period where no speech activity is present at the near-end and the far-end, comfort noise generator 110 is arranged to estimate the background noise according to the background noise in the near-end signal, such that the generated comfort noise will be an estimation of the background noise, since the background noise doesn't change very rapidly.

In one embodiment, as will be described below, the initiation of the determination of a near-end background noise estimation comprises an initiation of an update of a previously determined near-end background noise estimation. In another embodiment, as will be described below, the near-end background noise estimation comprises an autoregressive moving average filtering of each of a plurality of frequency components of the output of acoustic echo canceller 60. Optionally, the plurality of frequency components are received from processing functionality 80. In order to generate an accurate estimation of the near-end background noise, the estimation is determined only when speech activity is absent from both the near-end and far-end signals. Speech activity generally differs significantly from background noise, therefore estimating the near-end background noise while someone is talking will not be accurate. Although acoustic echo canceller 60 is arranged to reduce the amount of acoustic echo within the near-end signal, if the far-end signal comprises speech activity the output of acoustic echo canceller 60 will not be an accurate example of near-end background noise due to residual echo and due to losses from the processing of acoustic echo canceller 60.

Responsive to an indication from near-end speech detector 90 that speech activity is present on the near-end signal or an indication from far-end silence detector 100 that speech activity is present on the far-end signal, comfort noise generator 110 is arranged to terminate the determination of the estimation of the near-end background noise.

Comfort noise generator 110 is arranged to output the estimated near-end background responsive to: an indication by near-end speech detector 90 that speech activity is absent from the near-end signal, i.e. a near-end speaker is talking; and an indication by far-end silence detector 100 that speech activity is present in the far-end signal, i.e. a far-end speaker is talking. In one embodiment, white noise fast-Fourier transform (FFT) coefficients are modulated by the estimated background, thereby generating comfort noise to be output at far-end output 50. Due to the output comfort noise, the far-end speaker does not hear their own residual echo or low level noise which does not resemble the real near-end background noise. Playing comfort noise during periods of near-end speech would reduce the voice communication system to a half duplex system wherein only one talker could be heard at a time. Playing comfort noise during periods of silence at both the near-end and far-end is also undesirable as the far-end talker would prefer to hear the actual background noise at the near-end. Thus, the comfort noise is output to far-end output 50 when speech is present on the far-end signal yet absent from the near-end signal.

Figure 2:
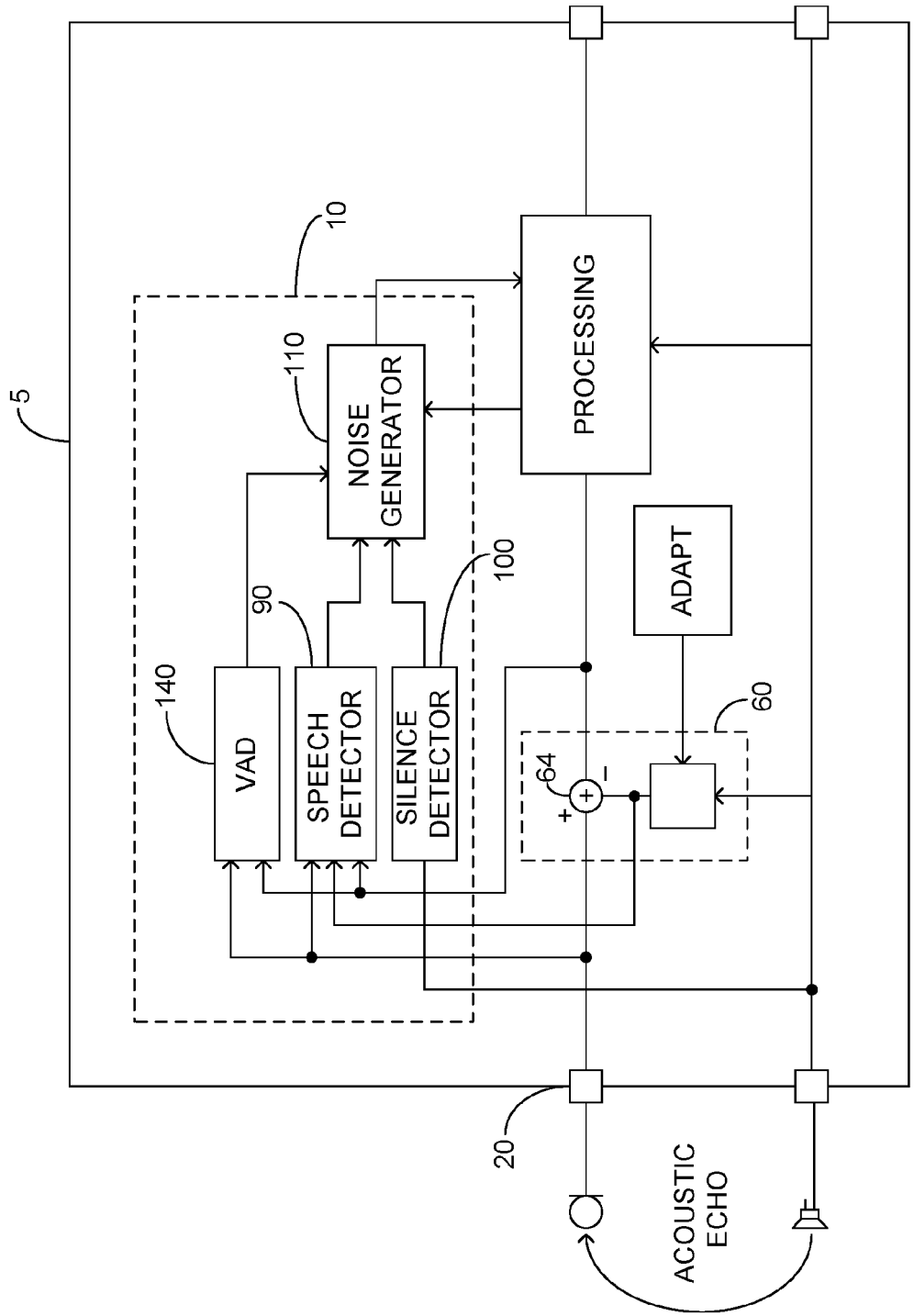
FIG. 2 illustrates a more detailed embodiment of the communication device portion of FIG. 1.

FIG. 2 illustrates a high level block diagram of communication device portion 5 with a more detailed embodiment of comfort noise generation apparatus 10. Particularly, comfort noise generation apparatus 10 further comprises a voice activity detector 140. A first input of voice activity detector 140 is coupled to near-end input 20 and a second input of voice activity detector 140 is coupled to the output of adder 64 of acoustic echo canceller 60. An output of voice activity detector 140 is coupled to a respective input of comfort noise generator 110. Near-end speech detector 90 is arranged to detect speech activity by distinguishing between speech and background noise. As described above, in one embodiment near-end speech detector 90 is arranged to distinguish between background noise and speech responsive to various cross correlation functions applied to: the near-end signal; the output acoustic echo estimate of acoustic echo estimation functionality 62; and the output of adder 64 of acoustic echo canceller 60. Voice activity detector 140 is a more complex detector and is arranged to distinguish between low level speech and the acoustic echo of the far-end signal which is present within the near-end signal, as is known to those skilled in the art at the time of the invention.

Comfort noise generator 110 is arranged to initiate the near-end background noise estimation determination responsive to an indication by far-end silence detector 100 that speech activity is absent from the far-end signal and an indication by each of near-end speech detector 90 and voice activity detector 140 that speech activity is absent from the near-end signal. Thus, as described above, the near-end background noise is estimated only when no speech activity is present at then near and far ends.

Figure 3:
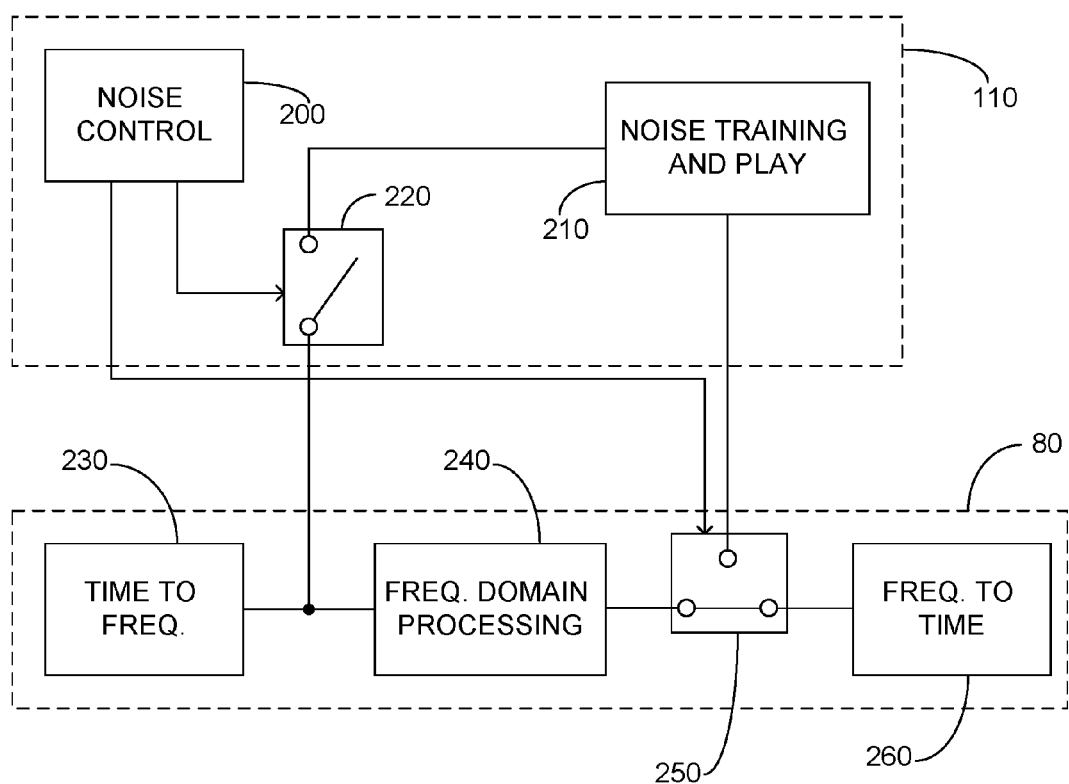
FIG. 3 illustrates a detailed embodiment of a comfort noise generator and a processing functionality of the communication device portion of FIG. 1.

FIG. 3 illustrates a high level block diagram of a detailed embodiment of comfort noise generator 110 and processing functionality 80 of communication device portion 5, and the connections therebetween. Comfort noise generator comprises: a control functionality 200; a comfort noise train and play functionality 210; and an controlled data path 220. Processing functionality 80 comprises: a time domain to frequency domain converter 230; a frequency domain processing functionality 240; an controlled data path 250; and a frequency domain to time domain converter 260. Controlled data path 220 and controlled data path 250 are each arranged to provide a controllable data transfer path between respective terminals thereof. In one embodiment, controlled data path 220 and controlled data path 250 can each be implemented as a dedicated software function. In another embodiment, controlled data path 220 and controlled data path 250 can each be implemented as a hardware implemented electronically controlled switch.

As described above, respective inputs of control functionality 200 are connected to near-end speech detector 90, far-end silence detector 100 and voice activity detector 140 (not shown). A first output of control functionality 200 is coupled to a control input of controlled data path 220 and a second output of control functionality 200 is coupled to a control input of controlled data path 250. A first terminal of controlled data path 220 is coupled to an output of time domain to frequency domain converter 230. A second terminal of controlled data path 220 is coupled to an input of comfort noise train and play functionality 210. An output of comfort noise train and play functionality 210 is coupled to a first terminal of controlled data path 250 of processing functionality 80. The output of time domain to frequency domain converter 230 is coupled to an input of frequency domain processing functionality 240 and an output of frequency domain processing functionality 240 is coupled to a second terminal of controlled data path 250. A third terminal of controlled data path 250 is coupled to an input of frequency domain to time domain converter 260. An output of frequency domain to time domain converter 260 is coupled to far-end output 50 (not shown), as described above.

In operation, responsive to an indication that no speech activity is present at both the near end and far end, control functionality 200 is arranged to: control controlled data path 220 to couple the output of time domain to frequency domain converter 230 to the input of comfort noise train and play functionality 210; and control controlled data path 250 to couple the output of frequency domain processing functionality 240 to the input of frequency domain to time domain converter 260. As described above, during silence at both the near and far ends comfort noise train and play functionality 250 is arranged to estimate the near-end background noise. Particularly, in one embodiment time domain to frequency domain converter 230 is arranged to convert the signal output by acoustic echo canceller 60 to the frequency domain by performing an FFT thereon. The FFT coefficient are separated into frequency sub-band, optionally in accordance to the Bark scale. Comfort noise train and play functionality 210 is arranged to filter the sub-band coefficients through an auto-regressive moving average (ARMA) filter. The averaged sub-band coefficients are used to update a previously stored estimate of the near-end background noise. As a result, any change in the near-end background noise is detected and the near-end background noise estimate is updated accordingly. As described above, the actual near-end background noise is output by processing functionality 80.

Responsive to an indication that no speech activity is present at the near end and an indication that speech activity is present at the far end, control functionality 200 is arranged to: control controlled data path 220 to decouple the output of time domain to frequency domain converter 230 from the input of comfort noise train and play functionality 210; and control controlled data path 250 to couple the input of frequency domain to time domain converter 260 to the output of comfort noise train and play functionality 210. As described above, in one embodiment FFT white noise is generated and the white noise is modulated by the near-end background noise estimation. The modulated FFT white noise is converted by frequency domain to time domain converter 260 to the time domain and is output to far-end output 50. Thus, comfort noise is output to the far-end speaker instead of the near-end signal. As described above, the comfort noise is an estimation of the near-end background noise and does not include acoustic echo of the far-end signal. In one preferred embodiment, due to the increased accuracy of the near-end background noise estimation, the generated comfort noise is provided immediately and gradual application of the comfort noise is unnecessary.

Responsive to an indication that speech activity is present at the near end, control functionality 200 is arranged to: control controlled data path 220 to decouple the output of time domain to frequency domain converter 230 from the input of comfort noise train and play functionality 210; and control controlled data path 250 to couple the input of frequency domain to time domain converter 260 to the output of frequency domain processing functionality 240. As described above, frequency domain processing functionality 240 is arranged to remove residual echo and noise from the signal output by acoustic echo canceller 60, the processed signal output from processing functionality 80 after conversion by frequency domain to time domain converter 260. As described above, when near-end speech activity is detected, comfort noise train and play functionality 210 is not arranged to update the near-end background noise estimation responsive to controlled data path 220.

Figure 4:
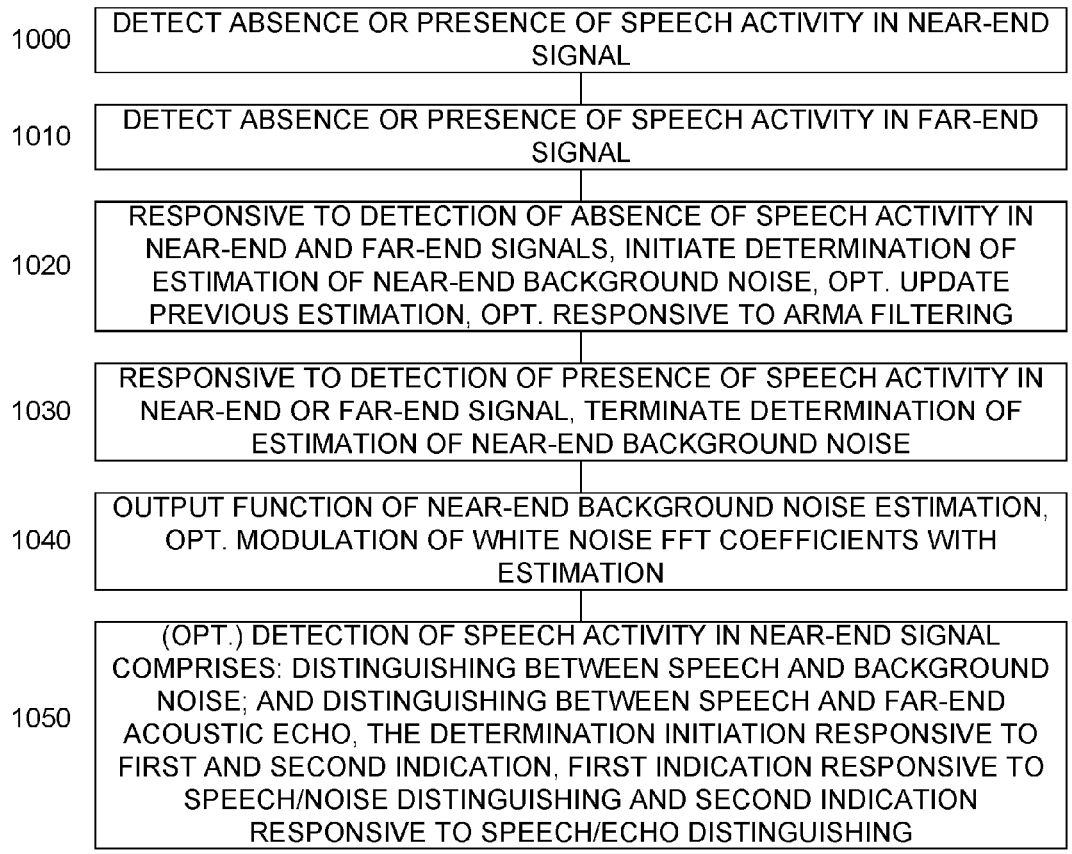
FIG. 4 illustrates a high level flow chart of a comfort noise generation method, according to certain embodiments.

FIG. 4 illustrates a high level flow chart of a comfort noise generation method, according to certain embodiments. In stage 1000, the absence or presence of speech activity is detected in a near-end signal. Particularly, the near-end signal is a signal received from a microphone at a communication device where the current method is performed. In stage 1010, the absence or presence of speech activity is detected in a far-end signal. Particularly, the far-end signal is a signal received from a communication device which is in communication with the communication device performing the current method, the far-end signal arranged to be output at a near-end speaker of the current communication device.

In stage 1020, responsive to a detection that speech activity is absent on the near-end signal and a detection that speech activity is absent on the far-end signal, a determination of an estimation of near-end background noise is initiated. Optionally, an update of a previous estimation of the near-end background noise is initiated. Optionally, the estimation is determined responsive to an auto-regressive moving average filtering of frequency components of the near-end signal, optionally after having acoustic echo removed therefrom by an acoustic echo canceller. Further optionally, the frequency components are determined by separating FFT coefficients of the signal into frequency sub-band in accordance with the Bark scale.

In stage 1030, responsive to a detection that speech activity is present on the near-end signal or a detection that speech activity is present on the far-end signal, the determination of an estimation of near-end background noise of stage 1020 is terminated.

In stage 1040, a function of the background noise estimation of stage 1020 is output, optionally responsive to a detection that speech activity is present on the far-end signal and absent on the near-end signal. Optionally, the function comprises a modulation of white noise FFT coefficients by the background noise estimation.

In optional stage 1050, the detection of the absence and/or presence of speech activity in the near-end signal comprises: distinguishing between speech and background noise; and distinguishing between speech and an acoustic echo of the far-end signal. The near-end background noise estimation determination of stage 1020 is initiated responsive to a first indication of the absence of speech from the near-end signal and a second indication of the absence of speech from the near-end signal. The first indication is responsive to the distinguishing between speech and background noise and the second indication is responsive to the distinguishing between speech and the far-end signal echo. Particularly, the first indication is output by a speech detector and the second indication is output by a voice activity detector.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable subcombination. In particular, the invention has been described with an identification of each powered device by a class, however this is not meant to be limiting in any way. In an alternative embodiment, all powered device are treated equally, and thus the identification of class with its associated power requirements is not required.

Unless otherwise defined, all technical and scientific terms used herein have the same meanings as are commonly understood by one of ordinary skill in the art to which this invention belongs. Although methods similar or equivalent to those described herein can be used in the practice or testing of the present invention, suitable methods are described herein.

All publications, patent applications, patents, and other references mentioned herein are incorporated by reference in their entirety. In case of conflict, the patent specification, including definitions, will prevail. In addition, the materials, methods, and examples are illustrative only and not intended to be limiting.

It will be appreciated by persons skilled in the art that the present invention is not limited to what has been particularly shown and described hereinabove. Rather the scope of the present invention is defined by the appended claims and includes both combinations and subcombinations of the various features described hereinabove as well as variations and modifications thereof which would occur to persons skilled in the art upon reading the foregoing description.

The invention claimed is:

1. A comfort noise generation apparatus comprising:
   a near-end speech detector arranged to detect speech activity in a near-end signal;
   a far-end silence detector arranged to detect speech activity in a far-end signal;
   an acoustic echo canceller arranged, responsive to the far-end signal, to estimate an acoustic echo of the far-end signal within the near-end signal and output a modified near-end signal, the modified near-end signal representing the near-end signal after removing a copy of the estimated acoustic echo from the near-end signal; and
   a comfort noise generator,
      wherein responsive to an indication from the near-end speech detector that speech activity is absent on the near-end signal and an indication from the far-end silence detector that speech activity is absent on the far-end signal, the comfort noise generator is arranged to initiate a determination of an estimation of near-end background noise, the estimation responsive to the near-end signal,
   wherein responsive to an indication from the near-end speech detector that speech activity is present on the near-end signal or an indication from the far-end silence detector that speech activity is present on the far-end signal, the comfort noise generator is arranged to terminate the determination of an estimation of near-end background noise,
   wherein the comfort noise generator is arranged to output a function of the near-end background noise estimation, and
      wherein the initiation of the determination of an estimation of near-end background noise comprises an initiation of an update of a previous background noise estimation, the update comprising a predetermined function of the modified near-end signal and the previous background noise estimate.

2. The apparatus of claim 1, further comprising
   a near-end voice activity detector arranged, responsive to the near-end signal and the output of the acoustic echo canceller, to detect speech activity in the near-end signal,
   wherein the arrangement of the near-end speech detector to detect speech activity comprises an arrangement to distinguish between speech and background noise responsive to the near-end signal, the estimated acoustic echo and the modified near-end signal,
   wherein the arrangement of the near-end voice activity detector to detect speech activity comprises an arrangement to distinguish between speech and an acoustic echo of the far-end signal, and
   wherein the initiation of the determination of an estimation of near-end background noise is further responsive to an indication from the near-end voice activity detector that speech activity is absent on the near-end signal.

3. The apparatus of claim 1, wherein the determination of an estimation of near-end background noise comprises an auto-regressive moving average filtering of each of a plurality of frequency components of the modified near-end signal.

4. The apparatus of claim 1, wherein the function of the near-end background noise estimation comprises a modulation of white noise fast-Fourier transform coefficients using the near-end background noise estimation.

5. A comfort noise generation method, the method comprising:
   detecting an absence of speech activity in a near-end signal;
   detecting a presence of speech activity in the near-end signal;
   detecting an absence of speech activity in a far-end signal;
   detecting a presence of speech activity in the far-end signal;
   responsive to the far-end signal, estimating an acoustic echo of the far-end signal within the near-end signal;
   removing a copy of the estimated acoustic echo from the near-end signal;
   outputting a modified near-end signal, the output modified near-end signal representing the near-end signal with the estimated acoustic echo copy removed;
   responsive to the detection that speech activity is absent in the near-end signal and the detection that speech activity is absent in the far-end signal, initiating a determination of an estimation of near-end background noise, the estimation of near-end background noise responsive to the near-end signal;
   responsive to the detection that speech activity is present in the near-end signal or the detection that speech activity is present in the far-end signal, terminate the determination of the estimation of near-end background noise; and
   outputting a function of the near-end background noise estimation,
      wherein the initiation of the determination of the estimation of near-end background noise comprises updating a previous background noise estimation, the update comprising a predetermined function of the modified near-end signal and the previous background noise estimation.

6. The method of claim 5,
   wherein the detecting the absence and presence of speech activity in the near-end signal comprises:
   distinguishing between speech and background noise responsive to the near-end signal, the estimated acoustic echo and the output modified near-end signal; and distinguishing between speech and the acoustic echo of the far-end signal responsive to the near-end signal and the output near-end signal,
    wherein the determination of the estimation of near-end background noise is initiated responsive to a first indication of the absence of speech from the near-end signal and a second indication of the absence of speech from the near-end signal, the first indication responsive to the distinguishing between speech and background noise and the second indication responsive to the distinguishing between speech and the far-end signal echo.

7. The method of claim 5,
wherein the determination of the estimation of near-end background noise comprises an auto-regressive moving average filtering of each of a plurality of frequency components of the output modified near-end signal.

8. The method of claim 5, wherein the function of the near-end background noise estimation comprises a modulation of white noise fast-Fourier transform coefficients using the near-end background noise estimation.

9. The apparatus of claim 3, wherein the predetermined function comprises the auto-regressive moving average filtering of each of the plurality of frequency components.

10. The method of claim 7, wherein the predetermined function comprises the auto-regressive moving average filtering of each of the plurality of frequency components.

* * * * *